United States Patent [19]

Göckelmann et al.

[11] Patent Number: 5,144,886
[45] Date of Patent: Sep. 8, 1992

[54] COFFEE MACHINE

[75] Inventors: Karl Göckelmann, Gerstetten; Rudi Geiger, Weissenstein, both of Fed. Rep. of Germany

[73] Assignee: WMF Württembergische Metallwarenfabrik Aktiengesellschaft, Geislingen/Steige, Fed. Rep. of Germany

[21] Appl. No.: 655,540

[22] Filed: Feb. 14, 1991

[30] Foreign Application Priority Data

Feb. 20, 1990 [DE] Fed. Rep. of Germany ....... 4005348

[51] Int. Cl.5 .............................................. A23F 5/16
[52] U.S. Cl. ...................................... 99/297; 99/30 P
[58] Field of Search ............. 99/289 R, 289 T, 289 D, 99/289 P, 287, 295, 297, 300, 302 P, 302 R, 304, 307

[56] References Cited

U.S. PATENT DOCUMENTS

| 1,496,806 | 6/1924 | Bossi | 99/289 R |
|---|---|---|---|
| 3,369,478 | 2/1968 | Black | 99/297 |
| 3,713,377 | 1/1973 | Arnett et al. | 99/295 |
| 4,271,752 | 6/1981 | Valente et al. | 99/289 R |
| 4,506,596 | 3/1985 | Shigenobu et al. | 99/289 T |
| 4,579,049 | 4/1986 | Rodrigues | 99/302 P |
| 4,709,625 | 12/1987 | Layre et al. | 99/289 R |
| 4,791,859 | 12/1988 | King | 99/289 T |
| 4,796,521 | 1/1989 | Grossi | 99/289 R |
| 4,873,916 | 10/1989 | Piscaer | 99/289 R |

FOREIGN PATENT DOCUMENTS

| 0052404 | 12/1889 | Fed. Rep. of Germany | 99/287 |
|---|---|---|---|
| 2640627 | 3/1978 | Fed. Rep. of Germany | 99/307 |
| 0325231 | 4/1903 | France | 99/287 |
| 0561957 | 5/1957 | Italy | 99/289 |

Primary Examiner—Harvey C. Hornsby
Assistant Examiner—James F. Hook
Attorney, Agent, or Firm—Finnegan, Henderson, Farabow, Garrett & Dunner

[57] ABSTRACT

A coffee machine with a brewing apparatus is described which contains a brewing vessel disposed removably and insertably on a support by detachable fasteners. A piston driven by a motor via a piston rod and a gear pin is movable within the interior of the brewing vessel. In order to facilitate the removal and insertion of the brewing vessel in a given direction for cleaning purposes and to be able to also exchange the brewing vessel, if required, the piston is connected to the gear pin via a separable coupling, which can be separated or coupled by removal or insertion movement of the brewing vessel in the given direction so that the brewing vessel can be removed and inserted together with the piston as a unit.

11 Claims, 5 Drawing Sheets

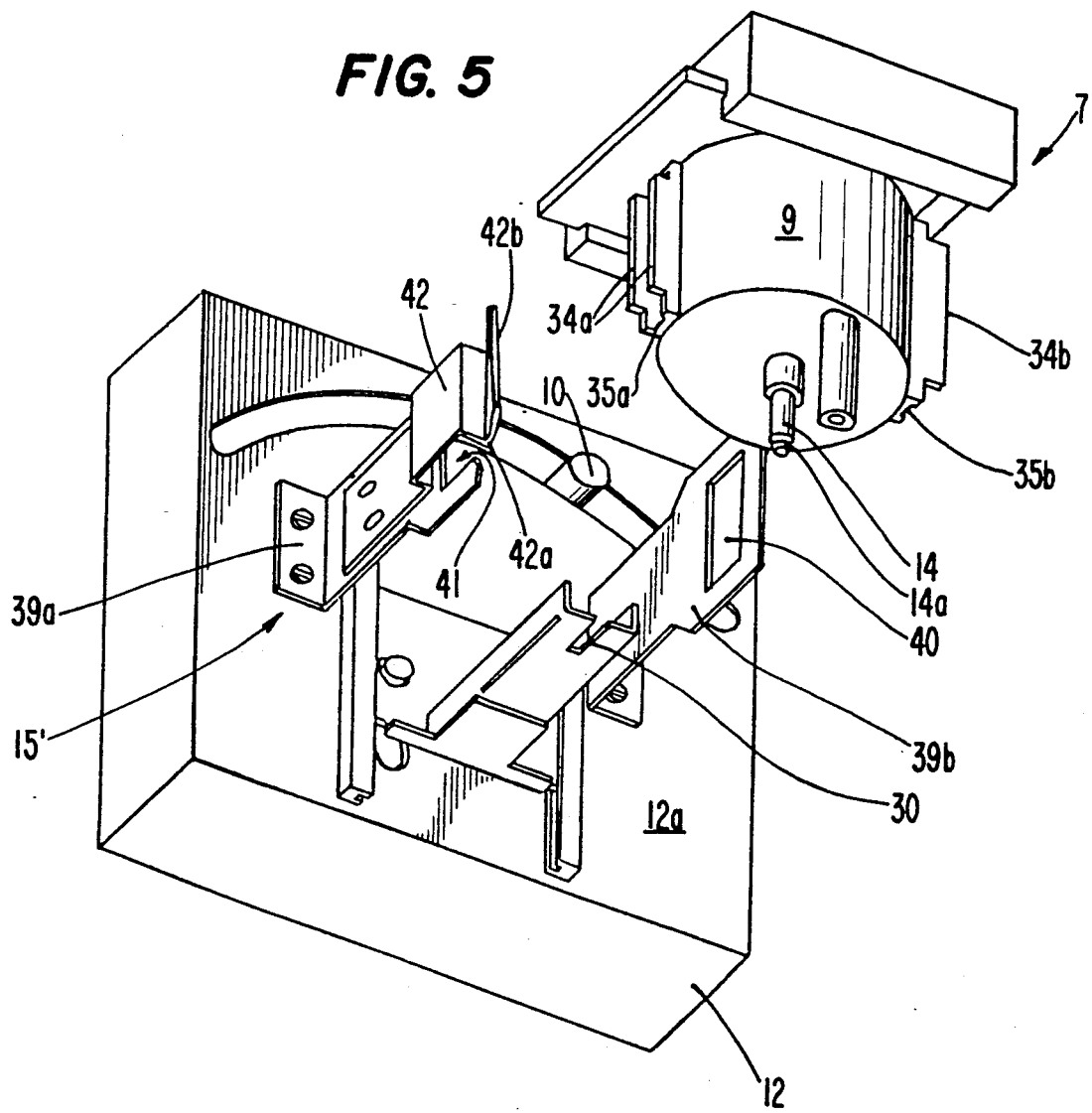

COFFEE MACHINE

BACKGROUND OF THE INVENTION

The invention relates to a coffee machine with a brewing means of the type which contains a brewing vessel disposed on a support in a removable and insertable fashion by means of a detachable fastening means and a piston movable in the interior of the brewing vessel and driven via a gear.

Such a coffee machine is revealed by EP-A-0 280 345. The known coffee machine has a tubular brewing vessel whose upper opening can be optionally closed by a closing element and whose lower opening is closed by a piston. Two projections project outwardly on both sides at diametrically opposite sides of the circumference of the brewing vessel, which end in an upper and a lower rounded-off head. Two mountings are fastened to a support next to the brewing vessel, which end in each case in one hook encompassing the lower head of the corresponding projection. One spring-loaded, liftable and lowerable hook engages over the upper head of each projection. The piston rod of the piston is connected with its gear leading to the driving motor via a hinge. Although it is not explicitly described, the brewing vessel of the known coffee machine can be removed and reinserted by pressing at first the spring-loaded hooks upwardly over the rounded-off head and the brewing vessel is tilted that much to the front about the axis of rotation of the piston rod until the brewing vessel has moved out completely from under the closing element. Then the brewing vessel can be withdrawn from the piston, the piston falling downwardly swinging in pendulum fashion. In such a device the brewing vessel can be removed for a thorough cleaning which is necessary from time to time, however, the re-insertion of the brewing vessel is extremely difficult. Upon reinsertion the tightly fitting piston must at first be introduced into the brewing vessel without tilting. This operation can require a lot of effort, because only one hand is available for introduction, because the other hand must hold the brewing vessel in the corresponding position. Since these actions must be carried out in the interior of the housing of a coffee machine, the reinsertion of the brewing vessel into the known coffee machine is extremely troublesome and time-consuming. Moreover, the brewing vessel cannot be exchanged in the known device, i.e. replaced by a larger brewing vessel for the brewing of larger quantities or by a smaller brewing vessel for the brewing of smaller quantities, since the piston remains on the gear. The cleaning of the piston is also difficult. The closing element and a stripper used for stripping off the used up coffee grounds cannot be taken out and must be cleaned in place in the interior of the machine.

SUMMARY OF THE INVENTION

Thus the invention is based on the objects of providing a coffee machine in which the dismounting and mounting in particular of the brewing vessel is facilitated and of ensuring in simple fashion that, if required, a brewing vessel may also be exchanged.

The object is solved by providing that the piston is connected to the gear via a separable coupling which is separable or connectable upon the removal and insertion movement of the brewing vessel in such fashion that the brewing vessel can be removed and inserted together with the piston as a unit.

Piston and brewing vessel can be removed as a unit by means of the development according to the invention and, if required, can be dismounted and remounted again outside the coffee machine, where both elements are better accessible. Due to this development, it is furthermore possible to replace the brewing vessel together with the piston by a larger or smaller brewing vessel without this requiring extensive mounting work It is preferred for the coffee machine of the present invention that in the brewing vessel which contains a closing element for closing a filling opening for the coffee powder, which is driven via a gear, the closing element is connected with its gear via a separable coupling which can be automatically separated or coupled upon the removal or insertion movement of the brewing vessel in such fashion that the brewing vessel, the piston and the closing element can be removed and inserted as a unit. It is achieved by means of this development that all elements coming into contact with the coffee solution can be removed as a unit and by means of a simple manipulation and their dismounting and their renewed mounting can be carried out outside the coffee machine. In this development, the closing element can also be exchanged in simple fashion.

In especially preferred coupling which substantially facilitates the simple dismounting the coupling contains a recess open in the direction of the removal or insertion movement and a projection engaging into the recess.

An especially preferred constructional development of the coupling for the piston includes a piston rod of the piston having an area of reduced diameter, which is received in a slot extending vertically to the piston rod and open in the direction of the removal or insertion movement in a support comprising part of a gear connecting the motor with the piston.

An especially preferred constructional development of the coupling for the closing element includes a driving cog formed as part of a gear connecting the closing element and the motor, which engages in a groove disposed on the closing element and open in the direction of the removal and insertion movement.

The removal and insertion is further facilitated by the development of the fastening device for the brewing including a snap means with at least one spring clip and with at least one holding projection engaging into an allocated holding opening. The holding opening is open in the direction of the removal or insertion movement and closable with a spring clip and is disposed on both sides next to the brewing means, which engages over corresponding projections on the brewing vessel. A first holding element is provided with a breakthrough and is disposed next to one side of the brewing vessel, and a holding opening open in the direction of the removal or insertion movement and a holding element provided with a spring clip are disposed next to the other side of the brewing vessel, a clamping force directed against the first holding element being applicable onto the brewing vessel by the spring clip. It is thus also possible to compensate smaller differences in diameter of the brewing vessel.

Greater differences in diameter of the brewing vessel can be compensated by providing that the projections are disposed on one base each, which is larger than the corresponding holding opening. In simple fashion this can be accomplished by increasing the height of the base in the case of smaller diameters of the brewing vessel and by reducing the base in the case of greater diameters of the brewing vessel. All elements coming into contact with the coffee powder can be removed and cleaned in the development wherein a stripper for stripping off used up coffee grounds is disposed on the closing element, which stripper can be removed and inserted together with the closing element as a unit.

BRIEF DESCRIPTION OF THE DRAWINGS

Examples of embodiment are explained in greater detail in the following by means of the drawings.

FIG. 5 shows a representation similar to FIG. 2 of a further example of embodiment of the invention.

DESCRIPTION OF THE PREFERRED EMBODIMENTS

Figure 1:
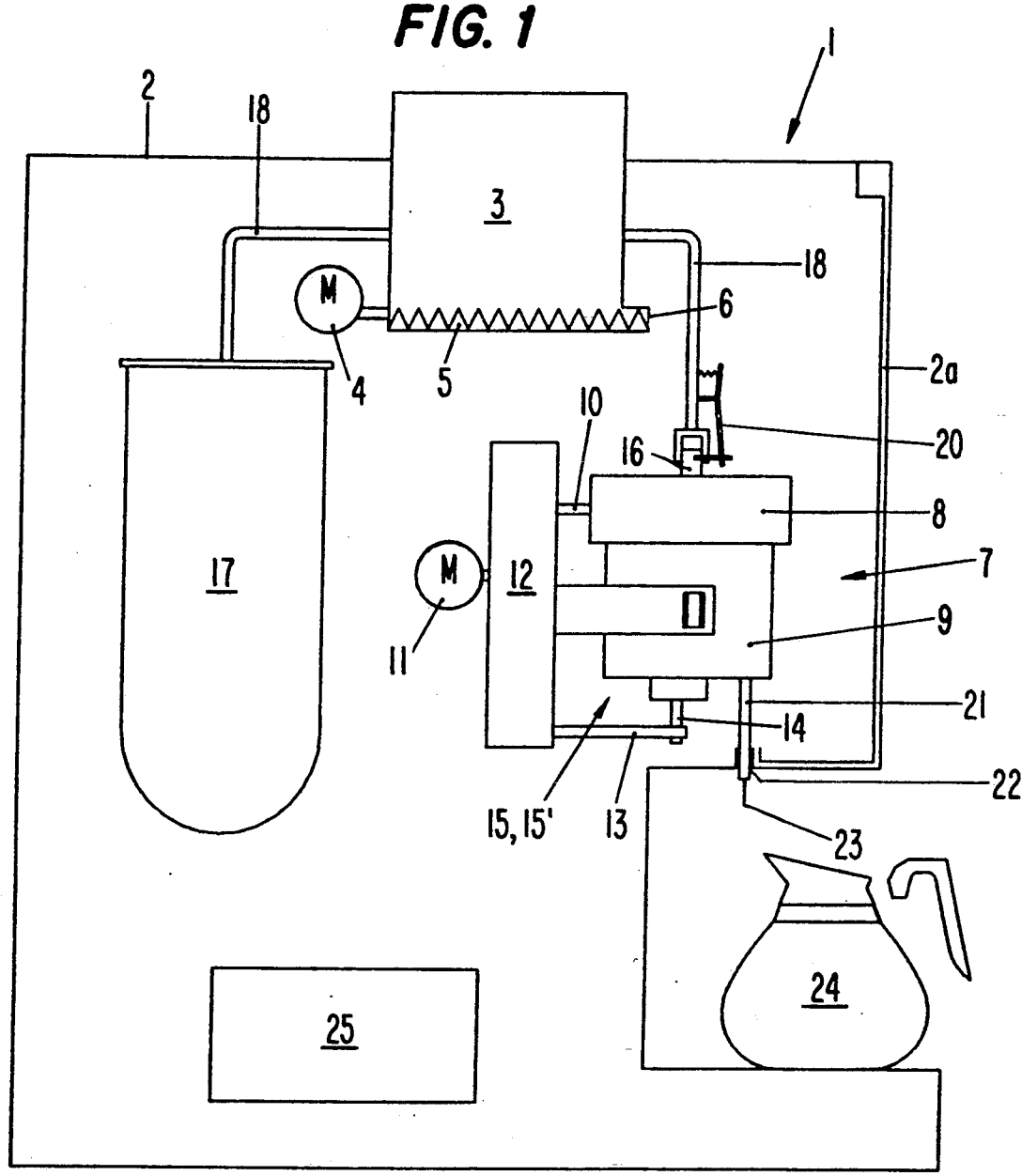
FIG. 1 shows a schematic representation of the coffee machine according to the invention.

The schematic representation of a coffee machine 1 with its most essential features can be gathered from FIG. 1. The coffee machine 1 has a housing 2, which is provided with a removable flap or door 2a at one of its side walls, preferably the front wall and whose upper cover wall is traversed by a reservoir 3 for the coffee powder. One of the customary apportioning screws 5 driven by a motor 4 is provided in the lower area of the reservoir 3, which conveys the coffee powder from the reservoir 3 towards the outside via an apportioning opening 6. The apportioning opening 6 is located vertically above a brewing means 7 disposed behind the door 2a, which contains a carriage 8 and a brewing vessel 9, the carriage 8 being movable vertically to the plane of the drawing to close an upper opening of the brewing vessel 9. The carriage 8 is connected to a gear actuated by a motor 11 and accommodated in a gear casing 12 via a driving pin 10. A support 13 is furthermore affixed to the gear casing 12, which receives a piston rod 14 of a piston movable in the interior of the brewing vessel in a manner which will still be described. The brewing vessel 9 is also disposed on the gear casing 12 via a detachable fastening means 15 which will also be described further below.

A spout 16 is disposed on the lower side of the carriage 8, into which a hot water line 18 designed as a flexible tube and coming from a hot water supply apparatus 17 ends. The tube 18 is detachably fastened to the spout 16 by means of a commercially available quick-release connector 20.

A coffee line 21 is disposed on the lower side of the brewing vessel 9 which extends to the outside through an opening 22 in the housing 2, the opening 22 being sufficiently large that the coffee line 21 can be pulled out of the opening 22 upon the withdrawal of the brewing chamber 9. The coffee line 21 ends in a discharge 23 disposed outside of the housing 2 and beneath the door 2a, beneath which a vessel to be filled with coffee beverage, a carafe 24 is represented, can be placed. The operation of the coffee machine is taken over by a control 25 only outlined schematically, as it is customarily provided in all coffee machine working automatically or semiautomatically.

Figure 2:
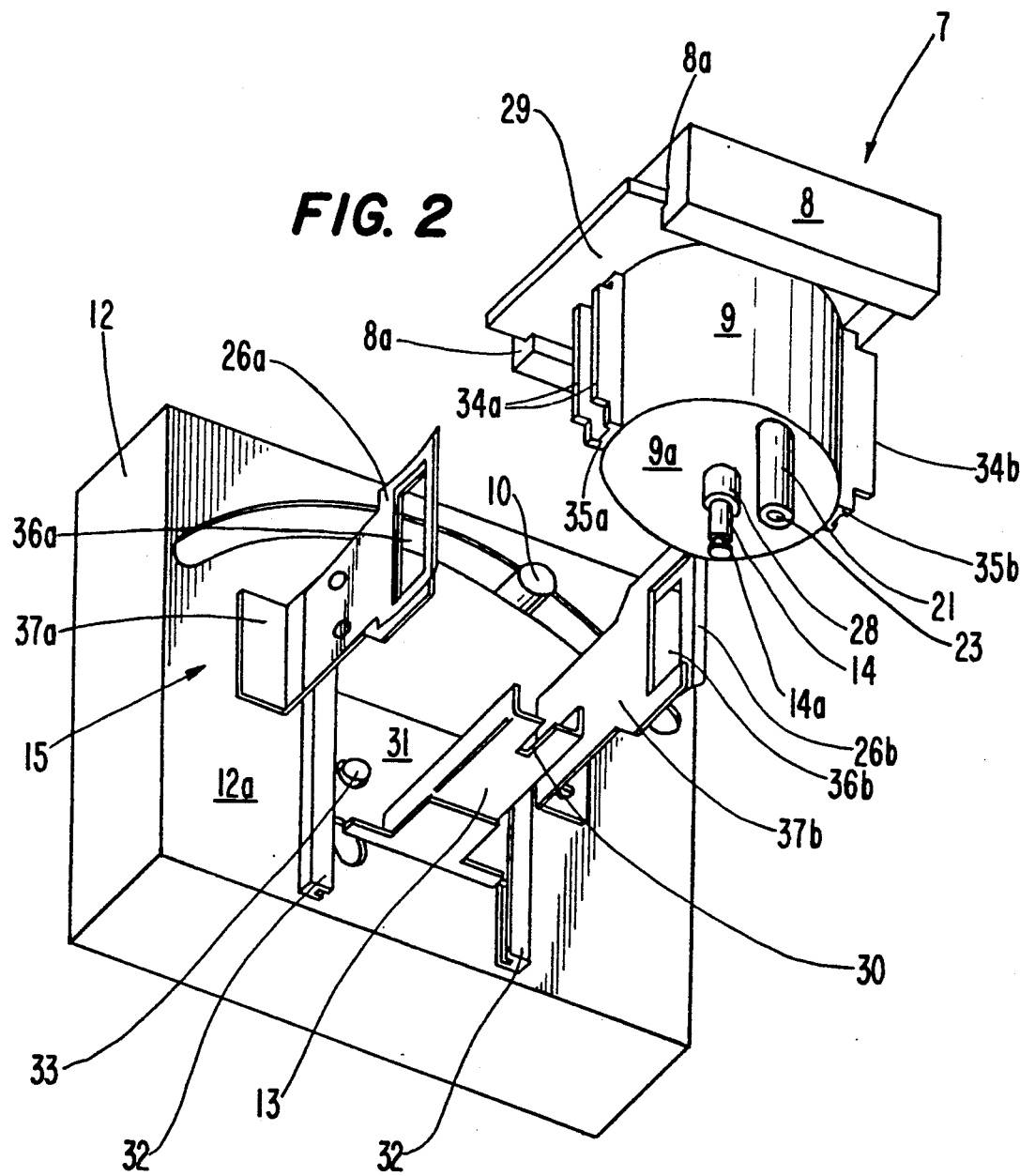
FIG. 2 shows an enlarged, perspective representation of the brewing means of FIG. 1 with removed brewing vessel, seen obliquely from below.
Figure 3:
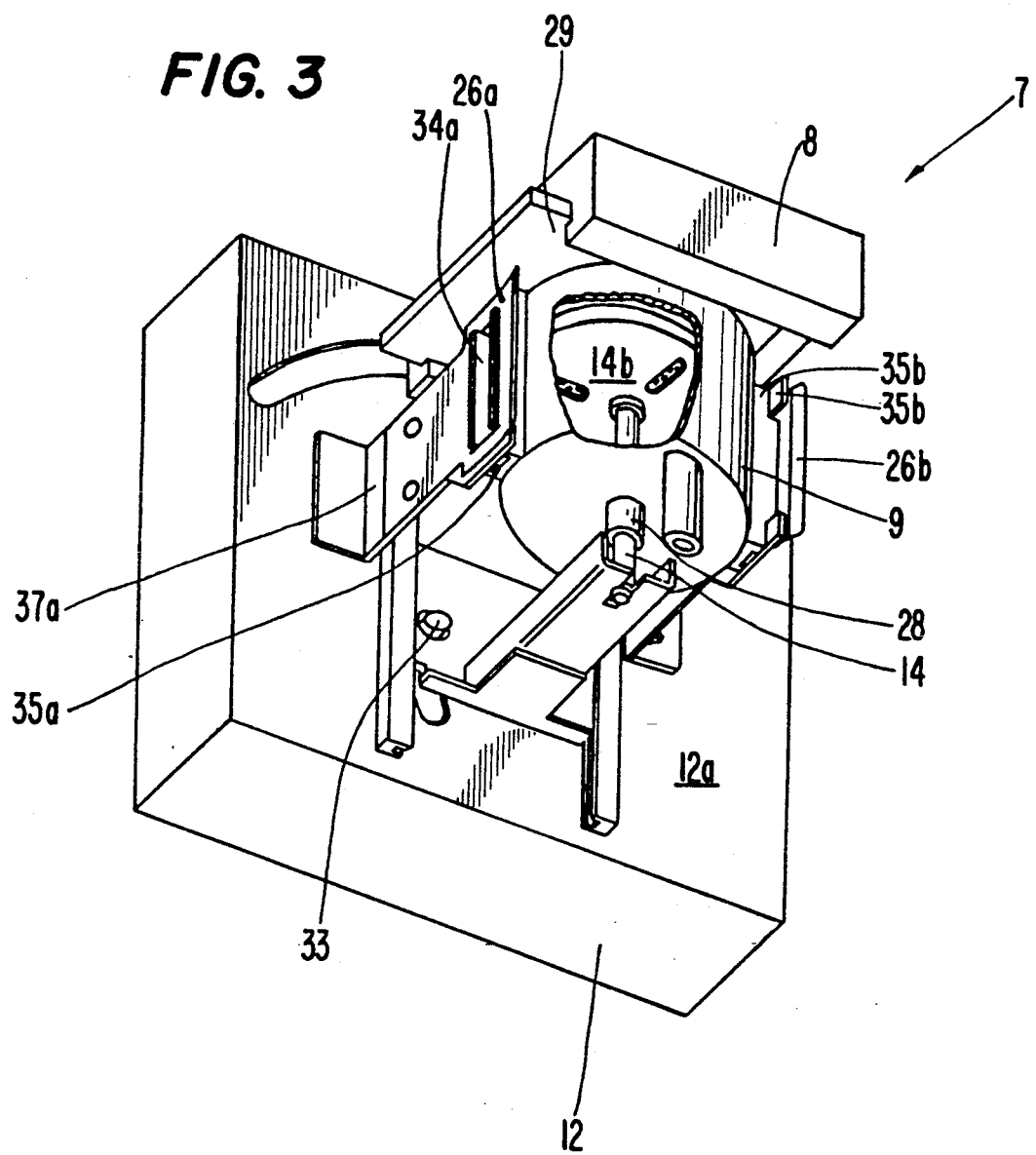
FIG. 3 shows a representation according to FIG. 2 with inserted brewing vessel.
Figure 4:
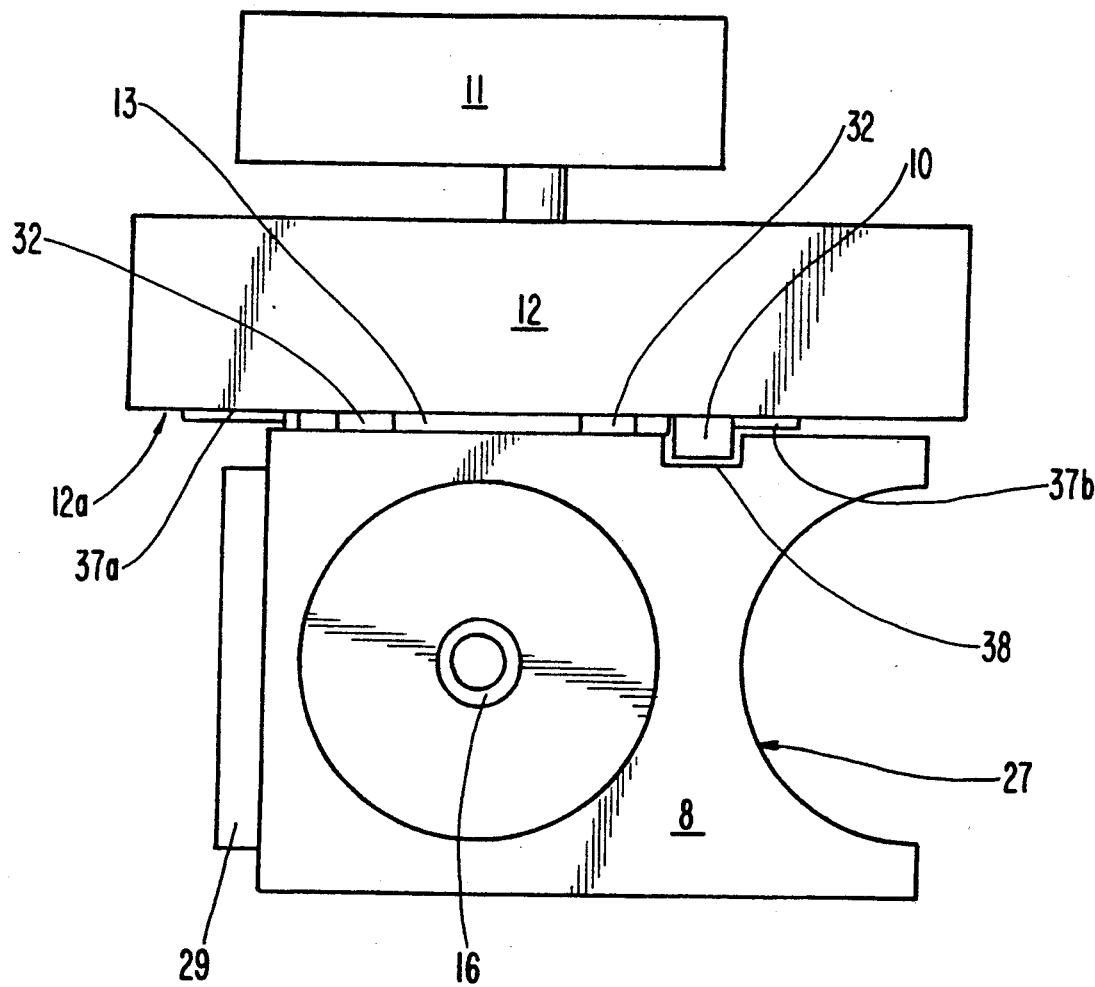
FIG. 4 shows a top view of FIG. 3.

A first example of embodiment of a detachable and insertable brewing means 7 can be gathered from FIGS. 2 to 4. The brewing vessel 9 is of a cup-shaped design and closed at the bottom by a circular bottom plate 9a, which is traversed by the coffee line 21 and a guide sleeve 28 and the piston rod 14. The upper side of the brewing vessel 9 opposite to the bottom plate 9a is open, the upper edge of the brewing vessel 9 being designed as sliding plate 29, on which the carriage 8 can slide by means of guides 8a, which engage over edges of the sliding plate 29 extending in parallel to each other.

The piston rod 14 has an area 14a of reduced diameter, which can be received in a slot 30 of the support 13. The slot 30 is open at the side pointing away from the gear casing 12 and has a width corresponding to the diameter of the area 14a or a slightly greater width, but is narrower than the diameter of the piston rod 14 above and below the area 14a so that the piston rod 14 can be separably coupled to the support 13. The support 13 runs in guides 32 via a guide plate 31, which are affixed to the support plate 12a of the gear casing 12. The guide plate 31 is traversed by a driving pin 33, which is part of a gear connecting the piston rod 14 with its driving motor 11 and brings about the up and down movement of the piston 14b, which is visible in FIG. 3 through an opening, in accordance with the operating conditions predetermined by the control means.

The fastening means 15 contains two pairs of webs 34a, 34b formed as holding projections, which are disposed in each case in parallel to each other on diametrically opposite sides of the outer wall of the brewing vessel 9. Both pairs of webs 34a, 34b are in each case connected to the outer wall of the brewing vessel 9 via a base 35a and 35b. The pairs of webs 34a, 34b are dimensioned in such fashion as regards distance and length that they can be received in the holding openings 36a and 36b designed as broad slots, which are provided in free ends of support-like holding elements 37a or 37b of the fastening means 15, the ends of the holding elements 37a, 37b not facing the holding openings 36a, 36b being screwed to the support plate 12a of the gear casing 12 on both sides of the brewing vessel 9. Spring clips, 26b which are fastened to the holding elements 37a, 37b and are suited to retain the pairs of webs 34a, 34b received in the holding openings 36a, 36b, each extends across the sides of each holding opening 36a, 36b, which are open at the front. The two bases 35a and 35b are larger than the holding openings 36a, 36b in at least one dimension.

As is in particular shown by FIG. 4 the carriage 8 has a substantially vertically extending groove 38 open in the direction towards the support plate 12a on its side facing the support plate 12a, into which the driving cog 10 engages, the groove 38 being slightly larger in its width than the diameter of the driving cog 10. The driving cog 10 is part of a gear (not shown) connecting the carriage 8 with the motor 11 and accommodated in the gear casing 12, by means of which the carriage can be horizontally displaced on the sliding plate 29 in accordance with the desired operating conditions. An end wall of the carriage 8, which extends transversely to the direction of displacement is designed as a stripper 27 for stripping off the used coffee grounds from the surface of the raised piston after the completion of the brewing process.

The piston 14 is received in the slot 30 of the support 14 with its diameter reduced in the area 14a in inserted condition (FIG. 3) and thus coupled to the driving pin 33 of the gear. The holding elements 37a and 37b engage over the pairs of webs 34a and 34b with their holding openings and rest on the bases 35a or 35b so that the brewing vessel 9 is held in such fashion that the piston rod 14 does not tilt in its guide sleeve 28 also in the case of a movement of the carriage 8 on the sliding plate 29. In the inserted condition of the brewing means 7 represented in FIG. 3 the coffee machine is ready for operation, the hot water line 18 being of course also connected, which was omitted here for reasons of clearness.

It is sufficient to press the spring clips 26a and 26b apart with their free ends after loosening the line connections so that they can be pulled by the pairs of webs 34a, 34b out of the holding openings 36a or 36b, if the brewing means with the carriage 8, the stripper 27, the brewing vessel 9 and the piston together with the piston rod 14 are moved away from the support plate 12a in substantially vertical fashion. Then the coupling between the carriage 8 and the gear and of the piston rod 20 and the gear is detached by pulling off the groove 38 from the driving cog 10 and pulling the area 14a of reduced diameter of the piston rod 14 out of the slot 30. The insertion is effected analogously.

FIG. 5 shows a further example of embodiment of the invention with a slightly modified fastening means 15'. Those elements which have not been changed as compared with the first example of embodiment are also designated with the same reference numerals in FIG. 5 and not explained again. The fastening means 15' for the brewing vessel 9 contains two holding elements 39a and 39b, which are constructionally changed as compared with the first example of embodiment, but which are, however, also screwed to the support plate 12a of the gear casing 12 next to the brewing vessel 9. One of the holding elements 39b is provided with a holding opening 40 designed as a breakthrough. The opposite holding element 39a has a holding opening 41 designed as a broad slot analogously to the holding elements 37a, 37b, which is open at the side not facing the support plate 12a. A spring clip 42 is fastened to the holding element 39a, which extends across the forwardly pointing, open side of the recess 41 with an abutment edge and projects beyond the holding element 39a in the direction towards the other holding element 39b. The spring clip 42 has furthermore, run-on surface 42b skewed in the direction towards the abutment edge 42a. The holding openings 40, 41 are dimensioned in such fashion that they receive the pairs of webs 34a, 34b on the brewing vessel, which are unchanged as compared with the first example of embodiment and rest on their bases 35a, 35b. The brewing vessel 9 is at first rotated by a small angular amount about its axis leading through the piston rod 14 for inserting the brewing means 7 so that the pair of webs 34b can be inserted into the opening 40. At the same time, the area 14a of the piston rod 14 is brought into alignment with the slot 30 and the groove 38 (not shown) is brought into alignment with the driving cog 10. Upon a reversed rotation of the brewing vessel 9 into the correct position, the pairs of webs 34a hit against the run-on surface 42b of the spring clip 42 and press it that much outwardly that the pairs of webs 34a can snap in the recess 41, the abutment edge 42a when securing the webs 34a against falling out. The removal of the brewing means 7 is carried out analogously.

The brewing means of both examples of embodiment can be dismounted for cleaning by withdrawing e.g. the carriage 8 from the sliding plate 29 and pushing the piston rod 14 through its guide sleeve 28 towards the inside so that the piston can be pulled out.

If an exchange of the entire brewing means or only of the brewing vessel 9 with the piston, is desired, occurring differences in diameter of the brewing vessel 9 can be compensated by an enlarged or reduced height of the base 35a, 35b so that the distance and the arrangement of the holding elements on the support plate need not be changed.

Modifying the described and drawn examples of embodiment, the invention can also be used in coffee machines of another type, e.g. with reservoirs. Compact webs, pins and other projections can be connected with correspondingly adapted holding openings instead of the pairs of webs. It is furthermore possible to provide the holding openings on the brewing vessel and to fasten the projections to the holding elements. Displaceable or pivotable clamping elements engaging over the holding plate on the brewing vessel and directly disposed on the support plate or locking projections locking in correspondingly designed locking recesses can be used instead of the support-like holding elements. A reverse arrangement is also conceivable for the coupling between the moving elements and the gear, it being e.g. possible to provide the driving cog on the carriage and a corresponding opening on the gear, or to provide a bent projection on the support for engagement with an angular guide designed as a longitudinal slot in the front side of the piston rod.

We claim:

1. A coffee making machine comprising: a housing having an internal support structure; brewing means including a brewing vessel disposed in said housing, said brewing means further including a piston movably disposed in the interior of said brewing vessel and a piston rod connected to said piston; and motor drive means disposed in said housing for reciprocating said piston in said brewing vessel, the machine further comprising door means provided in said housing for providing access to said brewing vessel and said piston, said door means also defining a removing and inserting direction with respect to said brewing vessel and said piston, fastening means mountingly connecting said brewing vessel to said housing internal support structure, and first coupling means engagingly connecting said motor drive means and said piston rod, wherein said fastening means is configured to provide selective mounting and dismounting of said brewing vessel by movement in said removing and inserting direction, and wherein said first coupling means is configured to provide engagement and disengagement coincident, respectively, with the mounting and dismounting of said brewing vessel by movement in said removing and inserting direction, whereby said brewing vessel and said piston can be removed and inserted as a unit.

2. The coffee machine according to claim 1, wherein said brewing vessel contains a closing element for closing a filling opening in said brewing vessel, said closing element being driven via said motor drive means and being connected via a second coupling means which can be separated or coupled upon the removal or insertion movement of the brewing vessel.

3. The coffee machine according to claim 1 wherein said first coupling includes a recess means disposed on one of said piston rod and said motor drive means and open in the direction of the removal or insertion movement and a projection engageable with the recess disposed on the other of said piston rod and said motor drive means.

4. The coffee machine according to claim 3, wherein said piston rod has an area of reduced diameter, and wherein said motor drive means includes a first drive support member having a slot extending vertically to the piston rod and open in the direction of the removal or insertion movement, said piston rod reduced area being receivable in said slot.

5. The coffee machine according to claim 2 wherein the second coupling means includes said motor drive means having a driving cog and wherein the closing element includes a groove open in the direction of the removal and insertion movement for receiving said cog.

6. The coffee machine according to claim 1, wherein the fastening means contains a snap member with at least one spring clip and with at least one holding projection engaging into an allocated holding opening formed in said snap member.

7. The coffee machine according to claim 6, wherein two snap members each having a holding opening open in the direction of the removal or insertion movement are disposed on opposing sides of the brewing vessel, and wherein corresponding projections engageable with said holding openings are provided on the brewing vessel.

8. The coffee machine according to claim 6, wherein said fastening means further includes a first holding element provided with a breakthrough and disposed next to one side of the brewing vessel, said snap member having said holding opening open in the direction of the removal or insertion movement being disposed next to the other side of the brewing vessel, said at least one spring clip of said snap member having a surface angled in the removal and insertion direction for contacting said brewing vessel during insertion movement.

9. The coffee machine according to claim 6, wherein the projections are disposed on respective base members each larger than the corresponding holding opening.

10. The coffee machine according to claim 1, wherein means for stripping used up coffee grounds from said piston is disposed on the closing element and which is removed and inserted together with the closing element and the piston as a unit.

11. The coffee machine as in claim 9, wherein said base members are sized in accordance with the intervening width of said brewing vessel to position said projections for engagement with said holding openings.

* * * * *